United States Patent
Temesi et al.

(10) Patent No.: US 7,304,456 B2
(45) Date of Patent: Dec. 4, 2007

(54) INPUT INRUSH CURRENT CONTROL AND/OR OUTPUT SHORT-CIRCUIT CONTROL TO A BOOST CONVERTER IN A POWER SUPPLY

(75) Inventors: Ernö Temesi, Nagykovácsi (HU); Attila Ozsváth, Bicske (HU)

(73) Assignee: Tyco Electronics EC Ltd., Bicske (HU)

( * ) Notice: Subject to any disclaimer, the term of this patent is extended or adjusted under 35 U.S.C. 154(b) by 0 days.

(21) Appl. No.: 10/685,112

(22) Filed: Oct. 14, 2003

(65) Prior Publication Data

US 2004/0120089 A1  Jun. 24, 2004

(30) Foreign Application Priority Data

Oct. 15, 2002  (EP)  .................................. 02023012

(51) Int. Cl.
*G05F 1/00*  (2006.01)
(52) U.S. Cl. ....................... 323/222; 323/284; 323/901; 323/908
(58) Field of Classification Search ................ 323/222, 323/284, 901, 908
See application file for complete search history.

(56) References Cited

U.S. PATENT DOCUMENTS

| | | | |
|---|---|---|---|
| 5,202,819 A * | 4/1993 | Min ............................ | 361/436 |
| 5,420,780 A | 5/1995 | Bernstein et al. ............. | 363/89 |
| 5,614,810 A | 3/1997 | Nostwick et al. ............ | 323/207 |
| 5,790,395 A * | 8/1998 | Hagen .......................... | 363/89 |
| 5,815,386 A * | 9/1998 | Gordon ........................ | 363/50 |
| 6,285,170 B1 * | 9/2001 | Matsumoto et al. ........ | 323/222 |

FOREIGN PATENT DOCUMENTS

| EP | 0 748 035 A1 | 12/1996 |
|---|---|---|
| EP | 1 176 688 A1 | 1/2002 |

* cited by examiner

*Primary Examiner*—Bao Q. Vu
(74) *Attorney, Agent, or Firm*—Barley Snyder LLC

(57) ABSTRACT

An electronic circuit is connected between input lines of an alternating input power supply and input lines of a boost converter to limit an input inrush current and/or an output short-circuit current supplied to the boost converter in a power supply. The electronic circuit includes a rectifier circuit to rectify alternating input current of the alternating current power supply, and a feedback circuit for feeding back a switching signal to the rectifier circuit circuit to switch the rectifier circuit on and off.

17 Claims, 2 Drawing Sheets

INPUT INRUSH CURRENT CONTROL AND/OR OUTPUT SHORT-CIRCUIT CONTROL TO A BOOST CONVERTER IN A POWER SUPPLY

This application claims the benefit of EP Patent Application No. 02023012.4, filed Oct. 15, 2002.

FIELD OF THE INVENTION

The invention relates to an electronic circuit for limiting an input inrush and/or short-circuit current supplied to a boost converter in a power supply.

BACKGROUND OF THE INVENTION

Many power supplies have voltage and current limiters in order to suppress undesirable and spurious current and voltage spikes. Sometimes the voltage spikes are generated by electrical equipment using the same power line, other times the transient surges are caused by the power supply being quickly switched between on and off positions.

In order to avoid damage to the power supply, inrush current needs to be suppressed. In many conventional power supplies there is an input capacitor or a capacitor bank. The input capacitor or the capacitor bank charges when the power supply is initially turned on. In this state, the capacitor or the capacitor bank acts as a short-circuit and does not limit input current. As a result, the inrush current may activate a circuit breaker or even overload a circuit near the power input.

To reduce the inrush current most conventional power supplies are provided with thermistors and relays. For example, U.S. Pat. No. 5,420,780 discloses a circuit for limiting an inrush current in a DC power supply. The inrush limiting circuit is placed between an alternating current (AC) input power line and a power supply input capacitor bank. A thermistor is located between the capacitor bank and an input diode bridge to limit an initial inrush current. Once the input capacitor bank is fully charged, an insulated-gate bipolar transistor (IGBT) switches a rectified line voltage to a boost power factor correction converter circuit to block the thermistor by means of a diode. This switching keeps the thermistor cold to maintain high resistance in case of a new off/on cycle.

Thermistors, however, cannot be used with large power supplies without risking damage to the thermistor. As a result, thermistors are being replaced with a common resistor shunted by a triac or a silicon controlled rectifier (SCR). For example, U.S. Pat. No. 6,055,167 discloses a circuit for limiting an inrush current wherein the input inrush current is reduced by phasing up an input voltage in a controlled manner. The circuit uses a SCR in an input bridge of the circuit to control the input inrush current. This arrangement, however, has its drawbacks in that if the SCR fails, the power supply will ultimately be damaged.

Another problem associated with power supplies is high current peeks and very high currents in the circuit that cause damage to the power supply when short-circuiting the direct current (DC) outputs. Conventional power supplies are provided with high voltage switches to suppress the short-circuit current. These switches are often costly, however, and increase the complexity of the circuit.

SUMMARY OF THE INVENTION

It is an object of the invention to provide an electronic circuit that limits an input inrush current in a power supply as well as limits a short-circuit current when short-circuiting a DC output of the power supply while reducing costs and/or the complexity of the electronic circuit.

This and other objects are achieved by an electronic circuit for limiting an input inrush and/or output short-circuit current supplied to a boost converter in a power supply wherein the electronic circuit includes a rectifier circuit for rectifying an input current of an alternating current power supply, and a feedback circuit for feeding back a switching signal to the rectifier circuit to switch the rectifier circuit on and off. The electronic circuit is connected between input lines of the alternating current power supply and input lines of the boost converter.

This and other objects are further achieved by an electronic circuit for limiting an input inrush and/or output short-circuit current supplied to a boost converter in a power supply wherein the electronic circuit includes a rectifier circuit for rectifying an input current of an alternating current power supply, and a controllable rectifying element connected between a current supplying output of the rectifier circuit and an input of the boost converter for controlling the current supplied to the boost converter. A feedback circuit feeds back a switching signal to the controllable rectifying element to change the current supplied to the boost converter. The electronic circuit is connected between input lines of the alternating current power supply and the input lines of the boost converter.

DETAILED DESCRIPTION OF THE INVENTION

Figure 1:
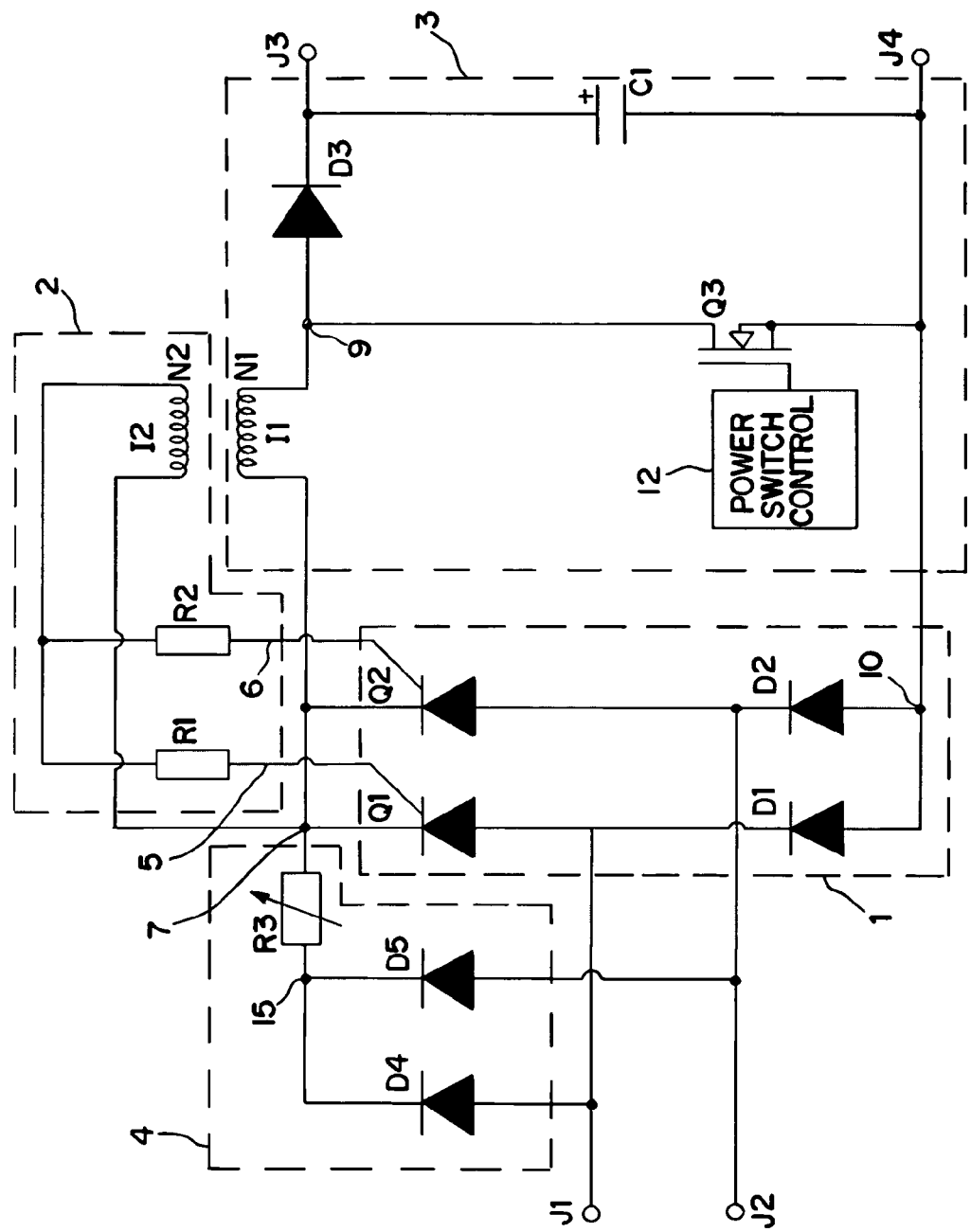
FIG. 1 is a schematic circuit diagram of an electronic circuit including a power supply with a boost converter according to a first embodiment of the invention.

FIG. 1 shows an electronic circuit including a power supply with a boost converter 3 for limiting an input inrush current and a short-circuit current according to a first embodiment of the invention. As shown in FIG. 1, the circuit includes a rectifier circuit 1 that rectifies an alternating current (AC) input current signal supplied from AC input terminals J1, J2. The rectifier circuit 1 is formed by a bridge circuit with four rectifying elements D1, D2, Q1, Q2. Two of the rectifying elements Q1, Q2, are controlled rectifiers that can be switched on or off between a conductive or non-conductive state in response to a switching signal supplied by lines 5 and 6. The two other rectifying elements D1, D2 may be, for example, diodes as shown in the figure or operational amplifier circuits, which rectify the AC input signal delivered from the AC input terminals J1, J2.

The circuit shown in FIG. 1 further includes a feedback circuit 2. A feedback inductor I2 of the feedback circuit 2 is connected at one side to a current supplying output of the rectifier circuit to form a first output terminal of a bridge circuit. The current supplying output of the rectifier circuit corresponds to junction point 7. A second output of the bridge circuit corresponds to junction point 10. The feedback inductor I2 is connected via two shunted resistors R1, R2 to lines 5 and 6, respectively, providing a switching signal to the rectifying elements Q1, Q2. The resistors R1, R2 may be variable resistors or other elements that output up to a maximum current. Alternatives are for example thermistors, in particular positive temperature coefficient (PTC) thermistors that limit their own dissipation and allow permanent short-circuit control with very low internal dissipation. It is, therefore, possible to feed back a switching signal through the feedback circuit 2 to the rectifier circuit 1 to switch the rectifying elements Q1, Q2 on or off between the conductive or nonconductive states.

In order to generate the switching signal for switching the rectifier circuit 1, the boost converter 3 is connected to the current supplying output of the rectifier circuit 1 by an input inductor I1. The input inductor I1 is connected via a diode D3 to a first direct current (DC) output terminal J3. Between the input inductor I1 and the diode D3, the input inductor I1 is connected to a power switch Q3. The power switch Q3 may be any controllable switch or power switch, such as, a transistor, etc. A power switch control 12 controls the switching of the power switch Q3 by a control signal. A single capacitor C1 is connected between the DC output terminal J3 and DC output terminal J4. A capacitor bank may also be used instead of the capacitor C1. The boost converter 3 will not be described in further detail herein, because boost converters, especially in boost power factor correction circuits, are well known in the art. A detailed description of an exemplary boost power factor correction circuit may be found in U.S. Pat. No. 4,677,366.

A current limiting circuit 4 is connected across the AC input signal lines from the AC input terminals J1, J2 to the current supplying output of the rectifier circuit 1. The current limiting circuit 4 includes two rectifying elements D4, D5 that rectify the AC input current signal supplied from the AC input terminals J1, J2. The rectified signals pass through a resistor R3 that is connected to the current supplying output of the rectifier circuit 1.

The operation of the electronic circuit according to the first embodiment and the switching of the rectifying elements Q1, Q2 by the switching signal will now be described in greater detail.

The switching signal is generated by the inductive coupling of the input inductor I1 of the boost converter 3 and the feedback inductor I2 of the feedback circuit 2. When the AC power supply is turned on, the current will flow through the current limiting circuit 4 towards the boost converter 3 supplying up to a maximum input current to the boost converter 3. In this state, the diodes D1, D2, D4, D5 build a bridge circuit that rectifies the AC input signal. The current supplying output of the initial bridge circuit of the diodes D1, D2, D4, D5 is connected via the resistor R3 to the input of the boost converter 3 at junction point 15. The input signal is thereby supplied via the resistor R3 to the boost converter 3, and the resistor R3 in the current limiting circuit 4 limits the input inrush current into the boost converter 3.

If a load connected to the DC output terminals J3, J4, consumes sufficient power, the inductive coupling of the input inductor I1 of the boost converter 3 will induce a sufficiently high voltage in the feedback inductor I2 of the feedback circuit 2. The induced voltage forms a switching signal that, in a case where the switching signal is sufficiently high, will bring the rectifying elements Q1, Q2 into the conductive state. As soon as the rectifier circuit 1 is switched on, the maximum available power from the AC power source may be supplied via the AC input terminals J1, J2 and via the rectifier circuit 1 to the boost converter 3. The available power to the boost converter 3, and thus an attached load, is then only limited by the available power of the AC power source. In the state in which the rectifying elements Q1, Q2 are in a conducting state, the rectifying elements Q1, Q2 and the diodes D1, D2 build the rectifier circuit 1. The rectifying elements Q1, Q2 thereby directly supply the input signal to the input of the boost converter 3.

If the DC output terminals J3, J4 are short-circuited, the voltage at the input inductor I1 of the boost converter 3 will drop to zero volts. As a result, no voltage will be induced to the feedback inductor I2. Because no voltage is induced to the feedback inductor I2, the rectifier circuit 1 or the rectifying elements Q1, Q2 are switched off. In this case, the current supplied from AC power supply from the AC input terminals J1, J2 is only supplied to the boost converter 3 via the current limiting circuit 4. Thus, in contrast to the situation where the rectifier circuit 1 is switched on and supplies up to the maximum power of the AC power supply to the boost converter 3, only a limited current will be delivered to the boost converter 3 by resistor R3. Hence, the short-circuit current in the power supply can be effectively controlled.

Figure 2:
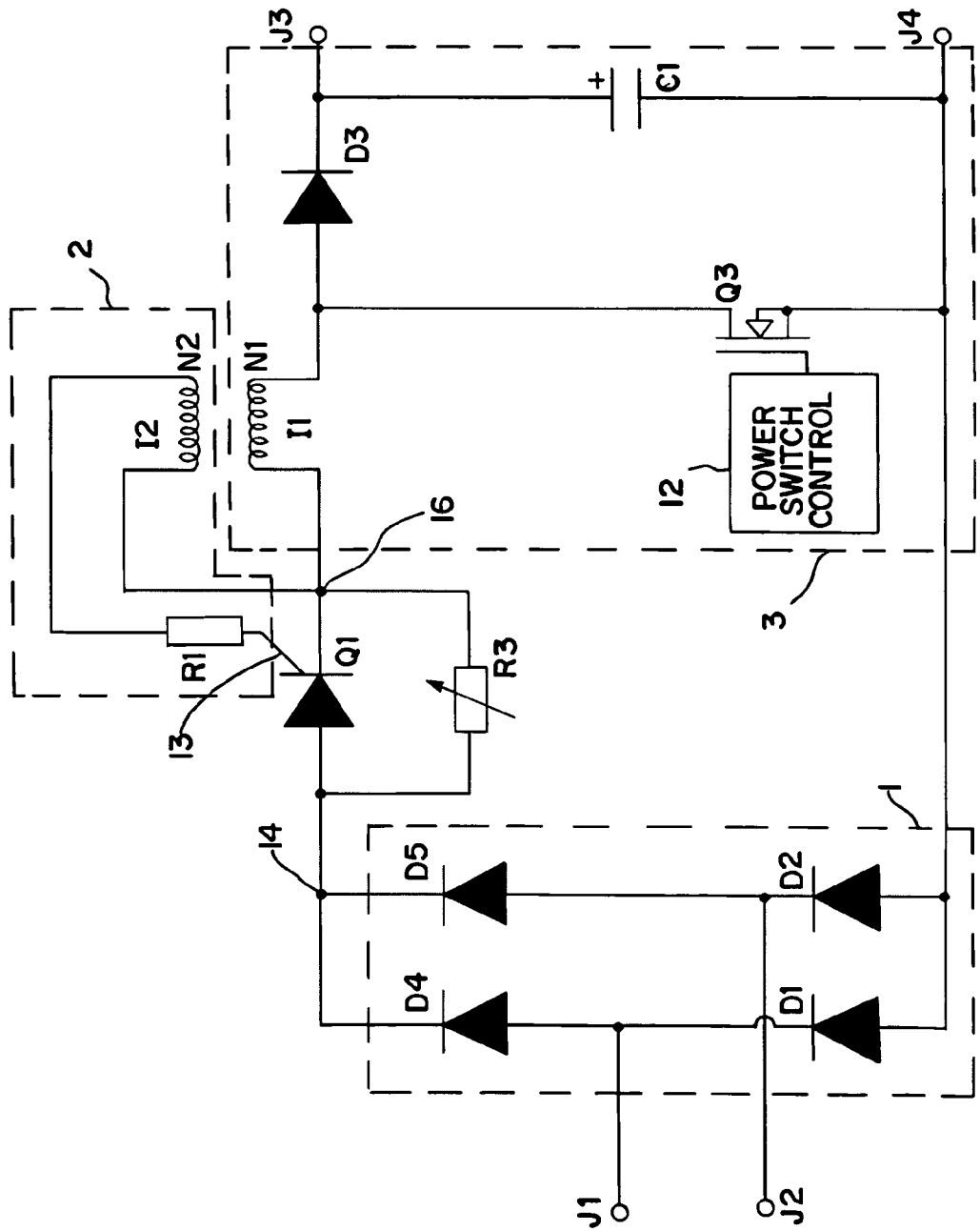
FIG. 2 is a schematic circuit diagram of an electronic circuit including a power supply with a boost converter according to a second embodiment of the invention.

FIG. 2 shows an electronic circuit including a power supply with a boost converter 3 for limiting an input inrush current and a short-circuit current according to a second embodiment of the invention. As shown in FIG. 2, the circuit includes a rectifier circuit 1. The rectifier circuit 1 has a similar bridge layout as the first embodiment of the invention shown in FIG. 1. The rectifier circuit 1 is connected to AC input terminals J1, J2 and includes four rectifying elements D1, D2, D4, D5. A power supplying output at junction point 14 of the rectifier circuit 1 is connected via a controlled rectifying element Q1 to the boost converter 3. The rectifying element may be, for example, a diode. A resistor R3 is arranged in parallel to the controlled rectifying element Q1. The resistor R3 may be, for example, a variable resistor, a normal resistor, or the like. Additionally, any element that limits an input current to a maximum level and that can be operated in a power supply is suitable to be employed as a resistor R3 in the circuit. Alternatives are for example thermistors, in particular PTC thermistors that limit their own dissipation and allow permanent short-circuit control with very low internal dissipation.

A feedback circuit 2 includes a feedback inductor I2 and a resistor R1. The feedback inductor I2 is connected between the resistor R1 and junction point 16. The junction point 16 is located between the controlled rectifying element Q1 and an input inductor I1 of the boost converter 3. The resistor R1 is connected via a switching signal line 13 to the controlled rectifying element Q1. A switching signal can be applied to the controlled rectifying element Q1 through line 13, which operates as a switch.

The boost converter 3 is identical to the boost converter 3 described in the first embodiment of the invention shown in FIG. 1. A detailed description of the boost converter 3 of the second embodiment of the invention will therefore be omitted.

The operation of the electronic circuit according to the second embodiment and the switching of the controlled rectifying elements Q1 by the switching signal will now be described in greater detail.

The switching signal of the second embodiment of the invention is generated in the same manner as the switching signal described in the first embodiment of the invention shown in FIG. 1 wherein that the switching signal is generated by the inductive coupling of the input inductor I1 of the boost converter 3 and the feedback inductor I2 of the feedback circuit 2. When the AC power supply is turned on, the rectifier circuit 1 will rectify the AC input signal supplied from the AC input terminals J1, J2. The rectified input signals are passed via the resistor R3 to the boost converter 3. In this state, the controlled rectifying element Q1 is in a nonconductive state, because no voltage drops across the input inductor I1 that could induce voltage in the feedback inductor I2.

If a load attached to the DC output terminals J3, J4 consumes sufficient power to cause the voltage at the input inductor I1 of the boost converter 3 to be sufficiently high, an induced voltage in the feedback inductor I2 of the feedback circuit 2 will bring the controlled rectifying element Q1 into a conductive state. In this case, the total current supplied to the boost converter 3 will flow through the controlled-rectifying element Q1. The rectifying element Q1 has a negligible resistance compared to the resistor R3.

If the DC output terminals J3, J4 are short-circuited, the voltage at the input conductor I1 will be caused to drop to zero volts by the diode D3 and the boost converter 3. Because no voltage is induced in the feedback inductor I2, the rectifying element Q1 is switched off. In this case, the current supplied from the AC power supply to the boost converter 3 is only supplied through the resistor R3, which will limit the maximum current flowing into the boost converter 3. Hence, the short-circuit current in the power supply can be effectively controlled.

It is important to recognize that in the first and second embodiments of the invention, the switching signal can be influenced by the number of windings N1 in the input inductor I1 of the boost converter 3 and the number of windings N2 in the feedback inductor I2 of the feedback circuit 2. The induced voltage $V_{I2}$ of the feedback inductor I2 is proportional to the ratio of the number of windings N2/N1 times the voltage $V_{I1}$ of the input inductor I1 of the boost converter 3. Thus, by choosing the appropriate ratio N2/N1 the switching voltage may be adapted to individual needs. The switching signal, and thus the switching of the rectifying elements Q1, Q2 or the controlled rectifying element Q1, may also be influenced by the polarization of the windings N2 of the feedback inductor I2 of the feedback circuit 2, for example, the threshold voltage of the rectifying elements Q1, Q2, the threshold voltage of the controlled rectifying element Q1, the value of the resistor R1, etc.

We claim:

1. An electronic circuit for limiting an input inrush and/or output short-circuit current supplied to a boost converter in a power supply, comprising:
   a rectifier circuit for rectifying an input current of an alternating current power supply; the rectifier circuit being a bridge circuit including at least two controllable rectifying elements that can be switched on and off by a switching signal;
   a feedback circuit having a feedback inductor inductively coupled to an input inductor of the boost converter, the feedback inductor being connected to a control input of each controllable rectifying element of the rectifier circuit for feeding back the switching signal to the rectifying element to switch the rectifier circuit on and off, and being connected to a current supplying output of the rectifier circuit; and
   the electronic circuit being connected between input lines of the alternating current power supply and input lines of the boost converter.

2. The electronic circuit according to claim 1, wherein the feedback circuit includes at least two resistors connected to the feedback inductor wherein the switching signal is fed over each of the at least two resistors to the control inputs of the at least two controllable rectifying elements.

3. The electronic circuit according to claim 1, wherein the feedback inductor and the input inductor each have a number of windings and the switching signal is controlled by a ratio of the number of windings.

4. The electronic circuit according to claim 1, wherein the feedback inductor and the input inductor each have windings and the switching signal is controlled by a polarization of the windings.

5. The electronic circuit according to claim 1, wherein the boost converter includes a power switch connected between the input inductor and a first output terminal, a diode connected between the input inductor and the first output terminal, and a capacitor connected between the first output terminal and a second output terminal.

6. The electronic circuit according to claim 1, wherein the rectifier circuit supplies a rectified input current to the boost converter when the rectifier circuit is switched on by the switching signal.

7. The electronic circuit according to claim 6, further comprising a current limiting circuit that limits the input current to the boost converter when the rectifier circuit is switched off by the switching signal.

8. The electronic circuit according to claim 7, wherein the current limiting circuit is connected across the input lines of the alternating current power supply and to a current supplying output of the rectifier circuit.

9. The electronic circuit according to claim 8, wherein the current limiting circuit includes at least two rectifying elements connected to at least one of the input lines of the alternating current power supply, the at least two rectifying elements being connected to a resistor, the resistor arranged between the at least two rectifying elements and the current supplying output of the rectifier circuit.

10. An electronic circuit for limiting an input inrush and/or output short-circuit current supplied to a boost converter in a power supply, comprising:
    a rectifier circuit for rectifying an input current of an alternating current power supply;
    a controllable rectifying element connected between a current supplying output of the rectifier circuit and an input of the boost converter for controlling the current supplied to the boost converter;
    a feedback circuit having a feedback inductor inductively coupled to an input inductor of the boost converter, the feedback inductor being connected to a control input of a rectifying element of the rectifier circuit for feeding back a switching signal to the controllable rectifying element to change the current supplied to the boost converter and being connected to a current supplying output of the rectifier circuit; and,
    the electronic circuit being connected between input lines of the alternating current power supply and the input lines of the boost converter.

11. The electronic circuit according to claim 10, wherein the feedback circuit includes a resistor connected to the feedback inductor between the feedback inductor and the controllable rectifying element and the switching signal is fed over the resistor.

12. The electronic circuit according to claim 10, wherein the feedback inductor and the input inductor each have a number of windings and the switching signal is controlled by a ratio of the number of windings.

13. The electronic circuit according to claim 10, wherein the feedback inductor and the input inductor each have windings and the switching signal is controlled by a polarization of the windings.

14. The electronic circuit according to claim 10, wherein the boost converter includes a power switch connected between the input inductor and a first output terminal, a diode connected between the input inductor and the first output terminal, and a capacitor connected between the first output terminal and a second output terminal.

15. The electronic circuit according to claim 10, wherein the rectifier circuit supplies a rectified input current to the boost converter when the controllable rectifying element is switched on by the switching signal.

16. The electronic circuit according to claim 15, further comprising a resistor for limiting the current supplied to the boost converter, the resistor being in parallel to the controllable rectifying element, the resistor supplies a limited input current to the boost converter when the controllable rectifying element is switched off by the switching signal.

17. The electronic circuit according to claim 10, wherein the rectifier circuit is a bridge circuit including at least two rectifying elements.

* * * * *